United States Patent [19]

Heiser

[11] 4,021,074
[45] May 3, 1977

[54] VEHICLE TRAILER

[75] Inventor: Jerome Jacob Heiser, Sioux Falls, S. Dak.

[73] Assignee: Agri-Industries of South Dakota, Sioux Falls, S. Dak.

[22] Filed: Apr. 26, 1976

[21] Appl. No.: 680,060

[52] U.S. Cl. .......................... 298/22 R; 296/28 D
[51] Int. Cl.² ........................................ B60P 1/16
[58] Field of Search .......... 298/22 AE, 22 R, 22 C, 298/22 F, 22 J, 22 P, 22 A, 22 B, 22 D, 17 R; 214/501; 296/28 D

[56] References Cited
UNITED STATES PATENTS

| 2,890,909 | 6/1959 | Hutchinson | 298/22 P X |
| 3,088,383 | 5/1963 | Ekstrom | 298/22 AE X |
| 3,814,479 | 6/1974 | Vornberger | 296/28 D X |
| 3,905,644 | 9/1975 | Feterl | 298/22 AE |

Primary Examiner—Frank E. Werner
Attorney, Agent, or Firm—James T. FitzGibbon

[57] ABSTRACT

A vehicle trailer of the fifth wheel type particularly adapted for attachment to a light towing vehicle such as a pickup truck. The trailer body includes front, rear, and sidewalls and a floor which slopes downwardly to the rear of said trailer body at a substantial angle. The trailer includes a chassis supporting the trailer body, and the chassis includes chassis rails disposed beneath and parallel to the trailer floor. These chassis rails include an upper, forward portion and a lower, rearward portion and a wheel mounting sub-frame disposed beneath the lower, rearward portion of said chassis rails. The attachment arrangement includes a tongue having a rear portion thereof attached to and extending forwardly from the upper, forward portion of said chassis rails, and a tube or the like extending downwardly from a forward portion of the tongue for engaging a fifth wheel or ball on the bed of the towing vehicle. Because of its configuration, the trailer includes an elevated front body portion with the floor thereof extending substantially above and forwardly of the lower, rearward portion of said chassis. In use, the elevated front body portion thereof is disposed in overlying relation to the rearmost portion of the towing vehicle, and the wheels and axles are spaced substantially apart from said rearmost portion of said towing vehicle.

9 Claims, 4 Drawing Figures

U.S. Patent    May 3, 1977    4,021,074
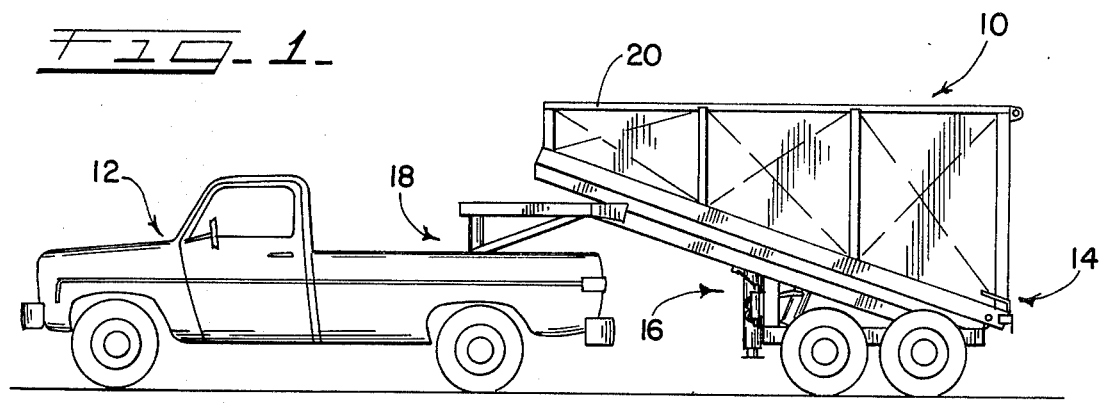
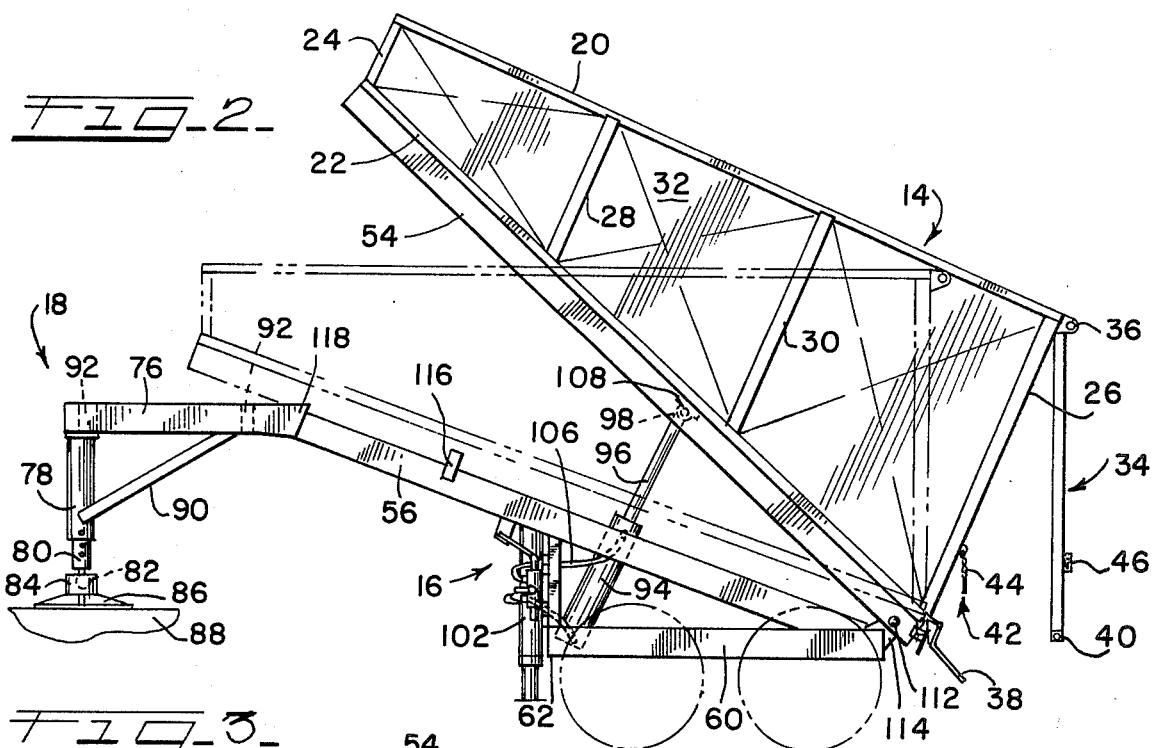
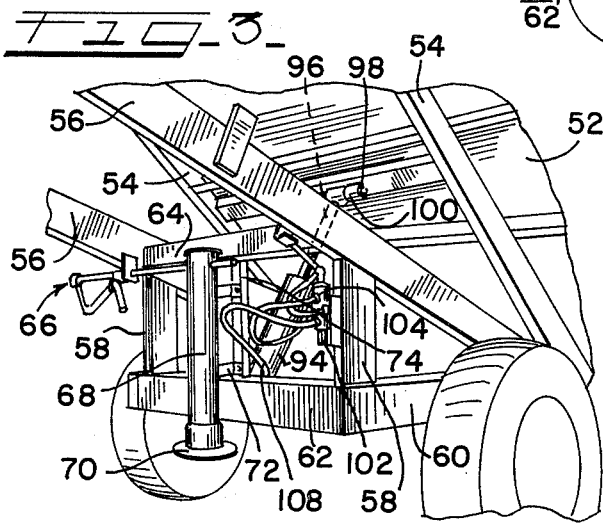
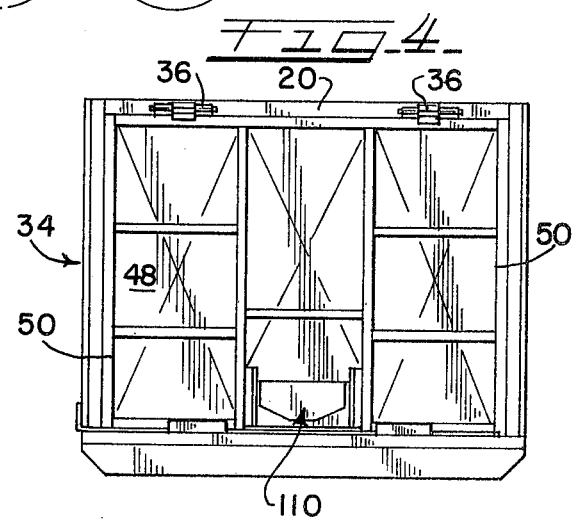

VEHICLE TRAILER

BACKGROUND OF THE INVENTION

The present invention relates generally to the vehicle trailers, and more particularly to improved trailers of the type adapted to dump the contents thereof, either with or without movement of the trailer body or portions thereof.

Various kinds of vehicle trailers, including those which unload or dump their contents either by gravity or by movement of the trailer body are well known; however, the present invention concerns trailers of novel construction which combine the advantages of easy unloading with numerous other advantages as will appear herein. Trailers of the invention utilize the so-called fifth wheel principle, and are particularly adapted for advantageous use with vehicles not normally intended to haul large trailers, such as pick-up trucks or other small vehicles.

In the trucking industry, the heaviest loads are normally carried by vehicles of the tractor and semi-trailer type, or in some cases, by a combination of tractor, semi-trailer, and full trailer. For various reasons, including difficulty in parking and other maneuvering, the combination of straight trucks with full trailers for heavy duty trucking is relatively rare in this country.

By semi-trailers is meant a trailer in which at least some, and usually a significant part, of the load is borne by the chassis of the towing vehicle, normally a tractor. In such constructions, one end of the semi-trailer rests above the rear axle or axles of the tractor, with the attachment and pivoting motion being accommodated by a plate and latch assembly which, by reason of its generally circular shape and central location of its pintle lock, is referred to as a fifth wheel.

The tractor and semi-trailer principle has been generally accepted as the most economical and practical solution for transporting loads which are large, heavy, or both. In the tractor and semi-trailer concept, the tractor is generally compact and mobile, while the semi-trailer accommodates the entire payload. The semi-trailer is not itself a full trailer, and hence is cheaper and simpler to manufacture than a complete trailer, which would by definition include running gear at the front as well as the rear thereof.

In the last few years, the characteristic advantages of small, open bodied vehicles, such as pickup trucks, have been taken advantage of by mounting in the beds of such trucks a "fifth wheel" assembly adapted to receive the forward part, or an extension of the forward part, of a vehicle trailer or semi-trailer. Such so-called fifth wheel pickup trucks have been used to carry loads which are much greater than those which could be accommodated merely by attaching a semi-trailer or trailer to a trailer hitch at the rear of the pickup truck or other towing vehicle.

The loads able to be carried (the "tongue weight") by a trailer hitch on a light vehicle, such as a pickup truck, are very limited because the trailer hitch is capable of carrying only a minimum load. This is true because of the moments created by the spacing between the trailer hitch and the truck axle, and because the hitch is sometimes supported only by an end part of the vehicle frame.

Because of the bed configuration of pickup trucks, however, it has been found necessary that the usual fifth wheel pickup truck semi-trailer include a goose neck or other elevated portion extending from the front of the trailer payload area to the pivot point or fifth wheel. As pointed out, the fifth wheel can support much greater tongue weight loads than can the trailer hitch, and thus the fifth wheel trailer in turn can accommodate much greater loads. In each case, a certain portion of the load appears as tongue weight, and the rest of the load is supported by the trailer wheels.

Ordinarily, fifth wheel trailers adapted for use with pickup trucks have included a relatively long goose neck or extension, because the rearward extent of the pickup body would otherwise interfere with the trailer box when turning was attempted.

As a result, many fifth wheel trailers adapted for use with pickup trucks have been much longer, and hence heavier, than would otherwise be desirable.

Referring now to another matter, there exists, in the argicultural field particularly, a demand for trailers which have a dumping capability and which are economical to make and use. Up until now, most of this demand has been met by trailers referred to as "gravity boxes", that is, trailers containing hopper-type bodies either fixed to or removably associated with a trailer chassis. Gravity boxes are desirable because they can be easily loaded with the agricultural product in question from the discharge chute of a combine, a conveyor, or the like. The gravity boxes may then be unloaded at an elevator, feed lot or other location, simply by gravity.

In other cases, such as where the nature of the crop or product being hauled requires a steep angle of inclination to induce gravity flow, fifth wheel trailers have been made which include conventional dumping mechanisms associated with rectangular box, flat bottom, type bodies. As pointed out above, however, trailers of this sort have been very long because of the clearance required between the trailer body and the truck box.

Conventional gravity boxes of the full trailer type may use shorter tongues, but full trailers are difficult to maneuver, especially during backing.

The present invention relates to a novel, compact fifth wheel trailer or semi-trailer which includes a trailer frame, a forward extension thereof, and a fifth wheel-engaging member, with the trailer body including sidewalls, a rear wall, a rearwardly inclined floor, and in one embodiment, means for tilting the box so as to further increase the inclination of the floor to achieve dumping of generally non-fluent products. In the preferred construction, the upper portion of the trailer body extends above and forwardly of the rear end portion of the associated pickup truck or other towing vehicle.

In view of the drawbacks and disadvantages of certain trailers and semi-trailers of the prior art, it is an object of the present invention to provide an improved trailer or semi-trailer unit.

A further object is to provide a trailer of the fifth wheel type which provides for improved maneuverability in use.

Another object is to provide a fifth wheel trailer capable of discharging or dumping a product contained therein, with or without the aid of a mechanism to elevate the trailer body or a part thereof.

Still another object is to provide a vehicle trailer unit having an inclined floor adapted to permit discharge of the trailer contents under the influence of gravity, with the trailer being arranged such that a portion of the body extends forwardly of the wheels and overlies a portion of the towing vehicle in use.

A further object is to provide a dumping type vehicle trailer which is adapted for advantageous combination with a towing vehicle of the pickup truck type.

Yet another object is to provide a trailer which has particular advantages and desirable characteristics for agricultural use.

Another object is the provision of a trailer which is compact and light in relation to its weight capacity.

The present invention achieves these and other objects by providing a trailer unit having a frame and means extending therefrom for engaging a fifth wheel mechanism on a towing vehicle, and a body having an inclined floor portion, with the body portion having a part adapted to extend above and forward of the rear portion of the towing vehicle. The above objects are also achieved by providing a trailer of the foregoing type which further includes means for further inclining the trailer floor for dumping the trailer contents.

The exact manner in which these objects and advantages are achieved in practice will become more clearly apparent when reference is made to the following detailed description of the preferred embodiments of the invention set forth by way of example and shown in the accompanying drawings, in which like reference numerals indicate corresponding parts throughout.

BRIEF DESCRIPTION OF THE DRAWINGS

FIG. 1 is a side elevational view of the trailer of the invention, shown being pulled by a light truck;

FIG. 2 is an enlarged side elevational view of the trailer of the invention, showing details of attachment to the prime mover, and showing the trailer bed in a raised position in solid lines and in the lowered position in phantom lines;

FIG. 3 is a perspective view showing the mechanism for tilting the floor of the trailer body and showing the trailer landing gear in the raised position; and FIG. 4 is a elevational view of the trailer body, taken from the rear thereof.

DESCRIPTION OF THE PREFERRED EMBODIMENTS OF THE INVENTION

While trailers of the invention may be adapted to different uses, a preferred embodiment of the trailer of the invention will be described wherein the prime mover is a light truck such as a pickup truck, where the trailer chassis is of the tandem axle type, and wherein electro-hydraulic means is provided for raising a portion of the trailer body. In the following description, it will be understood that there is a plane of symmetry extending vertically through the trailer and from front to rear thereof. Accordingly, in most cases, if the left hand portion of the trailer is described, for example, it will be understood that there is a corresponding right hand side which is not identified or described in detail.

Referring now to the drawings in greater detail, FIG. 1 shows the trailer of the invention, generally designated 10, to be removably attached to a prime mover in a form of a pickup truck 12. The trailer is shown to comprise a trailer body portion generally designated 14, a trailer chassis 16 and a towing vehicle attachment portion 18.

In particular, the body 14 of the trailer includes a pair of top body rails 20, a pair of bottom body rails 22, front body corner frame members 24 and a pair of rear body corner frame members 26. Intermediate body frame members 28, 30 may also be provided, and are shown to extend vertically between the upper and lower rails 20, 22. Suitable plates 32 are attached to these frame members, as by welding, for example, on either side and at the front, thus forming the front and sidewall portions of the trailer body. The rear wall of the trailer body 14 is formed by a door 34 which is mounted, as by a hinge assembly 36, to the transversely extending portion of the trailer body top rail 20. A pivotally mounted latch unit 38 engages a locking member 40 on the bottom of the rear door 34 so that the door 34 may swing to an open, rearward position (FIG. 2) under the influence of gravity when the locking pin 42 carried by the safety chain 44 is removed from the latch 46. FIG. 4 shows a steel plate 48, or the like, extending between members 50 which form the frame for the rear door 34. As shown in FIG. 3, a flat plate 52 extends between the bottom framing members 22 above the longitudinally extending trailer body rails 54, thus forming the inclined floor portion of the trailer body.

Referring again to FIGS. 2 and 3, the trailer chassis 16 is shown to include a pair of upper, inclined longitudinally extending chassis rails 56 disposed beneath their counterpart rails 54 on the trailer body. Vertically extending struts 58 extend downwardly from a central portion of the rails 56 to meet longitudinally extending lower frame members 60. A lower cross member 62 extends between the lower frame member 60, a counterpart rail (not shown) extends between the rear end of the longitudinal chassis members 56, 60, and an upper cross member 64 extends between the rails 56 above the struts 58.

Referring now to the trailer landing gear, a handle and crank assembly 66 of the known type is seen to extend into a tube jack 68, the lower portion of which includes a foot portion or skid plate 70 of enlarged diameter. The tube jack 68 is supported by braces 72 which are in turn joined to support members 74 extending vertically between the upper and lower cross members 64, 62. The operation of the tube jack 68, which serves as a balance member or landing gear for the trailer, is conventional and well known to those in the trailer making art, and forming no part of the invention which is novel per se, will not be further described herein.

Referring now to the towing vehicle attachment portion 18 of the trailer 10, (FIG. 2) a pair of towing rails 76, which extend forwardly from the front ends of the trailer chassis rails, are provided to support a downtube 78 which receives the trailer ball mount 80. In the construction shown, the ball 82 is received in a socket 84 fastened to a plate 86 mounted on the bed portion 88 of the pickup truck. Diagonal braces 90 extend between the towing rail 76 and a lower portion of the downtube 78. A pair of cross members 92 extend between the front and rear ends of the towing rails 76 which lie in the same vertical plane as the chassis rails 56.

Referring now to the mechanism for elevating the trailer body 14, a hydraulic cylinder 94 is affixed at the lower end thereof to the cross member 62. A piston (not shown) reciprocates within the cylinder 94 to extend and retract a rod 96, the end of which is attached, as by a pin 98 to a hinge mount 100 on the floor 52 of the trailer body 14. An electric motor 102 operates a hydraulic pump 104 for forcing fluid through hydraulic lines 106, 108 from a reservoir (not shown)

to the upper or lower portions of the piston and cylinder assembly 94. The double acting piston and cylinder assembly 94 provides positive raising and lowering of the trailer body 14. The motor, pump, piston and cylinder, and associated controls may be of any known type; however, one type of arrangment which has proved satisfactory in use is driven by electrical cables extending directly from the battery to the pump motor and capable of conducting currents of the order utilized, for example, to operate an engine starting motor or the like. Such an arrangement eliminates any possibility of overloading smaller capacity circuits, such as those which are sometimes provided merely for trailer lighting, etc.

Depending on the capacity of the trailer, single or dual wheels may be used at each of the axle ends; for loads in the vicinity of 12,000 to 15,000 pounds, single tires on each of the tandem axles have proved adequate; for loads of the order of 20,000 to 24,000 pounds or more, dual wheels and tires are preferred.

Wheel suspension is not critical, however, satisfactory results have been obtained using a trailing link type suspension with transversely extending coil springs or torsion bars used to provide the actual suspension movement.

Referring now to another feature of the invention, when the trailer is constructed approximately as shown, some 10 to 12 percent of the weight of the trailer will appear as tongue weight; when the trailer is fully loaded, 10 to 15 percent appears as tongue weight. Lighter tongue weights raise the possibility of trailer instability in use, and heavier weights overload the towing vehicle and make it difficult to maneuver.

The advantages of the configuration shown, that is, a fifth wheel trailer with a body having a floor disposed at a substantial angle of inclination, and having a front portion extending forwardly over the tailgate or rear bumper of the towing vehicle, are numerous. First, the unloading ease of the so-called gravity box type of trailer is retained. However, unlike the ordinary gravity box trailer, the semi-trailer of the present invention is easy to maneuver, including during vehicle parking.

The provision of a floor which is inclined from front to rear provides dumping in the rear rather than from between the wheels, as is the case with some gravity boxes. The discharge chute or tailgate of the trailer of the invention is much lower than is the discharge chute of side-unloading, hopper type gravity boxes.

The inclined floor provides a raised front portion. This permits a portion of the load to be carried near or even ahead of the rear bumper or tailgate of the towing vehicle, substantially reducing the overall length of the combination prime mover and trailer. In this connection, it will be appreciated that, in prior art fifth wheel type trailers, a great deal of space must be provided between the fifth wheel and the leading edge of the trailer box. In other words, the space from the trailer ball to the tailgate, plus the clearance required to permit turning, has heretofore been wasted space. Prior art trailers utilizing ordinary boxes or gravity boxes therefore utilize a goose neck construction which requires considerable weight in relation to its strength, as well as calling for long trailer frames. Trailers of the present invention use an inherently rigid, triangulated structure achieving compactness and better load capacity at reduced weight.

Moreover, while the preferred form of vehicle trailer shown includes a power dumping feature, the trailer may in many cases be dumped purely by gravity. Accordingly, the provision of means for raising the body under power adds versatility at low cost, and is a feature which need not be used each time the trailer is unloaded. Without the tiltable body, the trailer provides an improved gravity box type unit; with the addition of the trailer body tilting feature, a further improved power dumping trailer is provided, because the trailer is lighter and more compact and because less effort is required to raise the body with the inclined bed or bottom.

As shown in FIG. 4, a grain gate of a known type, generally designated 110, may be provided, whether or not the rear wall of the trailer body is mounted for movement.

Referring now to other incidental features of the invention, it will be noted that the trailer body 14 is pivotally mounted at the rear thereof by one or more rods 112 extending through the rear end portion of the trailer box rail 54 and through suitable openings in the mounting flanges 114 attached to the back end portions of the upper and lower chassis rails 56, 60. Each of the rails 56 includes gussets 116, 118 extending upwardly from the upper trailer chassis rails 56. These gussets provide lateral suppor for the body rails 54 over and above that provided by the pivot axis rod 112.

FIG. 3 shows that the trailer ball 82 is associated with the downtube 78. However, it will be understood that the ball may be mounted with respect to the trailer bed and the socket may be mounted on the downtube. For this purpose, an interchangeable mounting unit 80 is provided.

Trailers of the present invention have been found to be highly advantageous in use, particularly in agricultural environments. The trailers are useful for hauling grains of all kinds, typically accommodating 300 bushels or more of grain. The trailers have also been found very useful for transporting other farm products such as fruits and vegetables, and provide easy and economical load and unloading thereof together with good handling while being towed, backed up, or otherwise maneuvered.

It will thus be seen that the present invention provides a novel vehicle trailer having a number of advantages and characteristics, including those pointed out herein and others which are inherent in the invention.

A number of illustrative embodiments having been described by way of example, it is anticipated that certain changes and modifications will occur to those skilled in the art and it is anticipated that such changes and modifications may be made without departing from the spirit of the invention and the scope of the appended claims.

I claim:

1. A vehicle trailer having a trailer body, a trailer frame and a portion adapted for attachment to a towing vehicle, said trailer body including at least rear wall, side wall and bottom wall portions, said bottom wall portion forming the floor of said trailer body and extending upwardly and forwardly from the rear of said trailer body at a substantial angle, a trailer chassis disposed beneath and supporting said trailer body, said chassis including principal chassis rails disposed beneath said body floor in substantially parallel relation thereto, said principal chassis rails extending upwardly and forwardly for a substantial portion of the entire extend of said body floor so as to include an upper, forward portion and a lower, rearward portion, wheel mounting means disposed beneath said lower, rearward portion of said chassis rails, said attachment portion comprising a tongue having a rear portion thereof attached to and extending forwardly from said upper, forward portion of said chassis rails, means extending downwardly from a forward portion of said tongue for engaging trailer attachment means on the bed of said towing vehicle, said trailer thus including an elevated front body portion having the floor thereof extending substantially above and forwardly of said lower, rearward portion of said chassis and being adapted, in use, to have said elevated front body portion thereof disposed in overlying relation to the rearmost portion of said towing vehicle, and to have said wheel mounting means spaced substantially longitudinally apart from said rearmost portion of said towing vehicle.

2. A vehicle further as define in claim 1 in which said trailer further includes a front body wall extending substantially vertically upwardly from the forward portion of said body floor.

3. A vehicle trailer as defined in claim 1 in which means are provided adjacent said lower, rearward portion of said chassis for mounting said trailer body for pivotal movement with respect to said chassis.

4. A Vehicle trailer as defined in claim 1 which further includes means mounting said trailer body for pivotal movement in respect to said chassis, and means adapted to raise a portion of said body with respect to said chassis for dumping the contents of said trailer.

5. A vehicle trailer as defined in claim 1 in which said rear wall portion of said trailer body comprises a door mounted by hinges having the pivot axis thereof located at the top of said door and lying in a generally horizontal plane.

6. A vehicle trailer as defined in claim 1 in which said trailer body further includes trailer body rails, said body rails being disposed beneath said floor in supporting relation thereto, said body rails directly overlying said chassis rails throughout a substantial portion of the length of said chassis rails when said trailer body is in a normal position of use.

7. A vehicle trailer as defined in claim 1 in which said wheel mounting means includes tandem axles arranged so that the wheel and tire assemblies mounted thereon are closely spaced apart from front to rear.

8. A vehicle trailer as defined in claim 1 in which said tongue extends generally horizontally from said chassis rails, and in which said downwardly extending means includes an adapter to permit mounting either a ball or socket connector therein.

9. A vehicle trailer as defined in claim 1 in which said floor is inclined at an angle of from about 10° to about 20° from the horizontal in the normal position of use of said trailer body.

* * * * *